Feb. 7, 1933.  K. KOHL  1,896,958
SYSTEM FOR PRODUCING HIGH FREQUENCY WAVES
Filed Sept. 17, 1928   2 Sheets-Sheet 1

Feb. 7, 1933. K. KOHL 1,896,958
SYSTEM FOR PRODUCING HIGH FREQUENCY WAVES
Filed Sept. 17, 1928 2 Sheets-Sheet 2

Patented Feb. 7, 1933

1,896,958

UNITED STATES PATENT OFFICE

KARL KOHL, OF ERLANGEN, GERMANY

SYSTEM FOR PRODUCING HIGH FREQUENCY WAVES

Application filed September 17, 1928, Serial No. 306,605, and in Germany September 17, 1927.

The present invention relates to a device for producing high frequency oscillations of short wave length.

One of the objects of the invention is to produce high frequency oscillations having a wave length as small as one meter or less.

Another object of the invention is to produce undamped high frequency oscillations having a small wave length.

Further objects of the invention will appear more fully hereinafter.

The device which is enclosed in a vacuum consists of a condenser having a pair of spacedly disposed plates and a filament arranged between the plates. The filament is heated by a source of current and the condenser plates are connected respectively through suitable inductances to one side of the filament source of supply and a high voltage source of supply.

In the accompanying drawings, Figs. 1, 2, 3, 4 and 5 and 11 are diagrammatical views of the invention.

Figs. 6, 7, 8, 9 and 10 are detail views of the different arrangement of the condenser plates.

Figure 1:
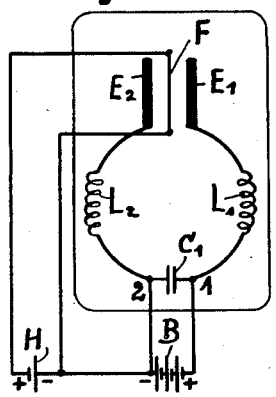

Referring to Fig. 1, filament F which is connected to a direct current source of electric supply H, is arranged between two plates $E_1$ and $E_2$ of a condenser. One of the plates $E_2$ is connected to the negative terminal of source of supply H which is connected to the negative terminal of a high voltage source of supply B. The other plate $E_1$ is connected to the positive terminal of the high voltage source of supply B through inductances $L_1$ and a condenser $C_1$ is connected to the plates $E_1$ and $E_2$ at points 1 and 2. The filament and the condenser plates are enclosed in a vacuum which is not illustrated.

When the filament F is heated a stream of electrons will flow from the filament to the plate $E_1$. The high voltage source of supply B will cause a flow of current from the plate $E_1$ to the filament F and to the source of supply H. The high voltage B source will also charge condenser $C_1$, which will negatively charge plate $E_2$ and vary the flow of electrons from filament F to plate $E_1$. As $E_2$ discharges, it grows more positive, resulting in a charging and discharging of the condenser $C_1$ producing an undamped oscillation in the circuit $E_1$, $L_1$, $C_1$, $L_2$, $E_2$. The wave length of the circuit is determined by the capacity between the plates $E_1$ and $E_2$, the selection of the inductances $L_1$ and $L_2$ and the capacity of condensers $C_1$.

It is possible to connect the plate $E_2$ to the positive terminal of the high voltage battery B and the plate $E_1$ to the negative terminal and the device will function substantially in the same manner. In order to concentrate the oscillations of the circuit entirely upon the oscillating circuit and to stabilize the circuit, the capacity of the condenser $C_1$ having plates $E_1$ and $E_2$ is somewhat enlarged by the additional capacity of condenser $C_2$. The capacity of condenser $C_1$ being determined by the distance between the plates $E_1$ and $E_2$ and the respective sizes and area, the capacity of condenser $C_2$ is such that it does not offer any large amount of resistance to the oscillations.

Figure 2:
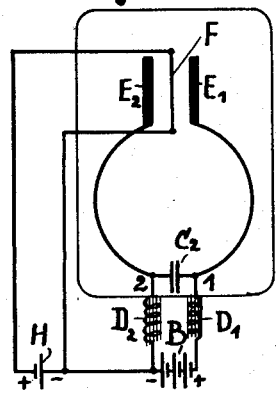

In Fig. 2 there is represented an embodiment of the invention in which the plates $E_1$ and $E_2$ are connected directly to a condenser $C_2$ and the plates of the condenser $C_2$ are connected to a high voltage source of supply B through choke coils $D_1$ and $D_2$. This arrangement will concentrate the oscillations upon the oscillating circuit and if it is desired to produce an extremely short wave length high frequency oscillation, the choke coils may be omitted.

Figure 3:
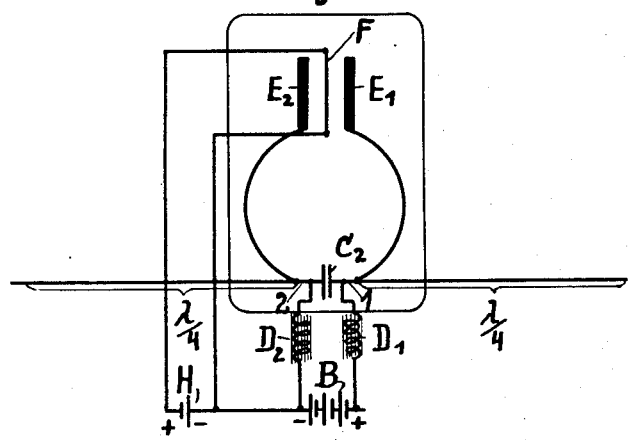

The radiating element of the generator consists, as is shown in Fig. 3, of linear conductors connected to each plate of the condenser $C_2$ and at the point where the choke coils $D_1$ and $D_2$ are connected. The conductors have a length of $\frac{l}{4}$ which is measured from the nodal point.

Figure 4:
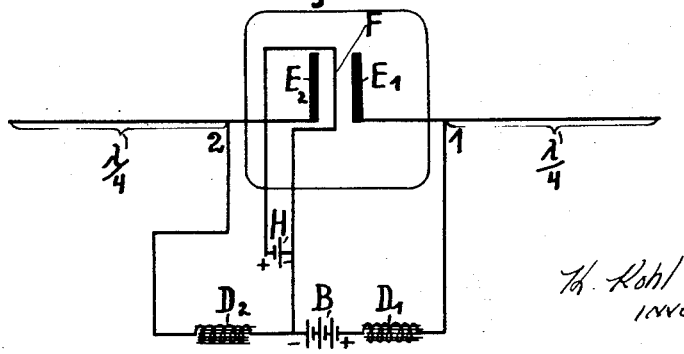

Fig. 4 illustrates an embodiment of the invention in which the radiating elements are connected to the terminals of the plates $E_1$ and $E_2$ and which are connected to the coils $D_1$ and $D_2$, the condenser $C_2$ being omitted.

As is illustrated, the choke coils and the condenser may be connected to the condenser plates $E_1$ and $E_2$ outside of the vacuum receptacle in which it is contained. However, in cases where a very short wave length is desired, it is desirable to arrange the entire oscillating circuit including the condenser having the plates $E_1$ and $E_2$, the filament, the condenser $C_2$ and the inductances or choke coils inside the vacuum receptacle.

Figure 5:
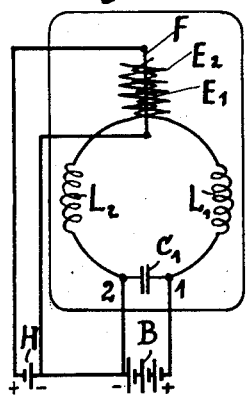
Figure 6:
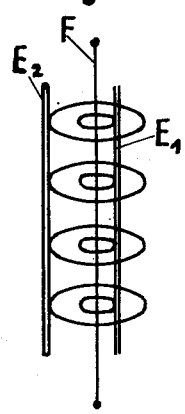
Figure 7:
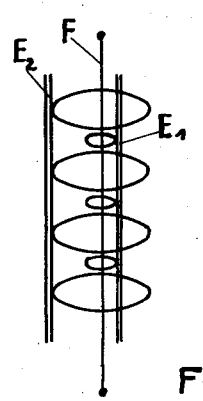
Figure 8:
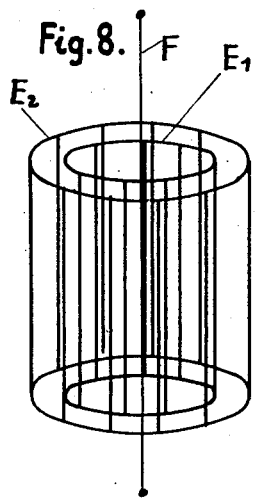
Figure 9:
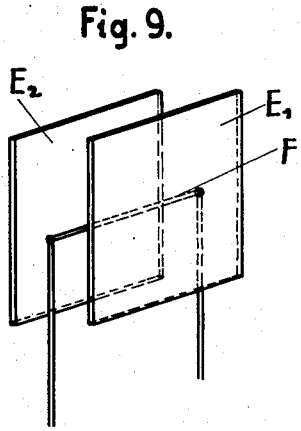
Figure 11:
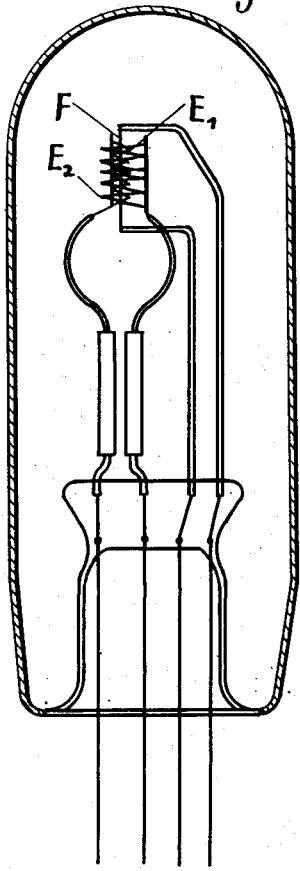
Figure 10:
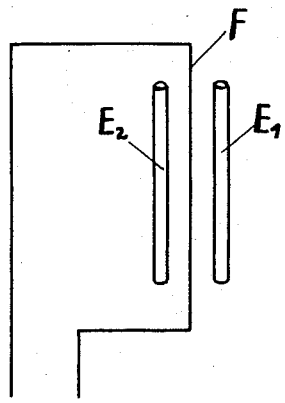

Figs. 5, 6, 7, 8, 9 and 10 illustrate several forms and arrangements of the plates and filaments. As is shown in Fig. 5, the plates of the condenser C comprise two concentric coils which permit a larger change in the capacity of the condenser. In Figures 6, 7 and 8, the plates are made up of concentric rings which are fastened to supports and which permit the placing of the rings in the same or in different planes. Fig. 9 illustrates an embodiment of the invention which is very simple and which gives very good results, the condenser consisting of two plates between which the heating filament is disposed. It is however, not necessary in this case that the heating filament be arranged in the middle of the two plates and it may be arranged on the outside thereof. The position of the filament depends, not only upon the voltage of the supply heating the filament, but also upon the wave length desired. In Fig. 10, the condenser plates are shown in the form of single conductors arranged parallel to each other and having disposed between them the heating filament. Finally, Fig. 11 illustrates a transmitting tube for a constant wavelength of about 30 cms. to scale. The condenser armatures are constituted by two concentric electrodes $E_1$ and $E_2$ which surround the heating filament F, which electrodes form a closed oscillatory circuit by means of their circularly bent supporting wires.

It is possible to produce high frequency oscillations of comparatively short wave lengths by means of a common three electrode tube which includes in a circuit therewith the properly selected inductances or choke coils. However, it has been found that in the employment of such a tube it is not possible to produce high frequency oscillations having a wave length which is less than fifty centimeters in magnitude.

While this invention has been disclosed as embodied in several particular forms, it is to be understood that it is capable of embodiment in other forms without departing from the spirit and scope of the invention.

What I claim is:

1. A device for producing high frequency waves comprising a pair of spaced plates, a filament between the plates, a source of direct current supply for the filament, a source of high voltage supply, said plates being in circuit, respectively, with the positive and negative points of the high voltage supply, inductance elements in the circuit of the plates, said plates and inductance elements constituting only one oscillatory circuit.

2. A device for producing high frequency waves comprising a pair of spaced plates, a source of high voltage supply, an inductance element between one plate and one terminal of the supply, another inductance element between the other plate and the other terminal of the supply, a condenser bridging the circuit between the plates, a filament between the plates, a direct source of supply for the filament and in circuit with the high voltage supply, said plates and inductance elements constituting only one oscillatory circuit.

In testimony whereof I affix my signature.

KARL KOHL.